US008922368B2

(12) United States Patent
Grasso

(10) Patent No.: US 8,922,368 B2
(45) Date of Patent: Dec. 30, 2014

(54) DEVICE AND METHOD FOR CONDITIONALLY TRANSMITTING DATA

(75) Inventor: Marc Henri Antoine Marie Grasso, Naarden (NL)

(73) Assignee: Koninklijke Philips N.V., Eindhoven (NL)

(*) Notice: Subject to any disclaimer, the term of this patent is extended or adjusted under 35 U.S.C. 154(b) by 310 days.

(21) Appl. No.: 13/501,152

(22) PCT Filed: Oct. 13, 2010

(86) PCT No.: PCT/IB2010/054625
§ 371 (c)(1),
(2), (4) Date: Apr. 10, 2012

(87) PCT Pub. No.: WO2011/048526
PCT Pub. Date: Apr. 28, 2011

(65) Prior Publication Data
US 2012/0206262 A1    Aug. 16, 2012

(30) Foreign Application Priority Data
Oct. 19, 2009   (EP) .................................... 09173397

(51) Int. Cl.
G08B 21/00     (2006.01)
(Continued)

(52) U.S. Cl.
CPC ......... *A63F 13/12* (2013.01); *A63F 2300/6045* (2013.01); *A63F 2300/204* (2013.01);
(Continued)

(58) Field of Classification Search
USPC ........ 340/540, 546, 407.1, 545.5, 545.2, 547, 340/428, 538.15, 539.11, 539.23; 345/158, 345/502, 503, 504, 1.1, 156, 173; 455/569.1, 423, 456.3, 414, 12.1, 456, 455/412.1, 556.1, 502, 41.2; 709/318, 228
See application file for complete search history.

(56) References Cited

U.S. PATENT DOCUMENTS

| 7,339,484 B2 | 3/2008 | Pradhan et al. | |
|---|---|---|---|
| 2004/0003133 A1* | 1/2004 | Pradhan et al. | ............... 709/318 |

(Continued)

FOREIGN PATENT DOCUMENTS

WO     2009013646 A2     1/2009

OTHER PUBLICATIONS

Lakshminarayanan et al: "Practical Device Association Protocols for Wireless Enabled Personal Devices"; IEEE Communications Society, WCNC, Wireless Communications and Networking Conference, 2005, vol. 4, pp. 2484-2489.

*Primary Examiner* — Jennifer Mehmood
*Assistant Examiner* — Mirza Alam
(74) *Attorney, Agent, or Firm* — Jones Day

(57) ABSTRACT

The device (31) of the invention comprises a receiver (33) for receiving from a further device (41) an identifier identifying a person in the vicinity of the device, warning means (35) for providing a warning signal to a user of the device and a transmitter (37) for transmitting data to said further device. The device further comprises a controller (39) for performing the method of the invention. The device is operative to instruct said warning means (35) to provide a warning signal in dependence on the identified person, to use a gesture detector (43) for detecting a specific gesture by said user from among a plurality of gestures in response to the warning signal and to instruct said transmitter to transmit said data to said further device upon detection of said specific gesture, wherein said data depends on said specific gesture. The computer program product of the invention enables a programmable device to perform the method of the invention.

9 Claims, 1 Drawing Sheet

(51) Int. Cl.

| | | |
|---|---|---|
| *G08B 13/08* | (2006.01) | |
| *H04B 3/36* | (2006.01) | |
| *G09G 5/08* | (2006.01) | |
| *G06F 3/041* | (2006.01) | |
| *G06F 15/16* | (2006.01) | |
| *G06F 3/033* | (2013.01) | |
| *A63F 13/30* | (2014.01) | |
| *G06F 3/01* | (2006.01) | |

(52) U.S. Cl.
CPC ... *A63F 2300/105* (2013.01); *A63F 2300/1031* (2013.01); *A63F 2300/405* (2013.01); *G06F 3/017* (2013.01); *A63F 2300/208* (2013.01)

USPC ..... 340/540; 340/546; 340/407.1; 340/545.5; 340/547; 345/158; 345/173; 709/228; 709/231; 715/863

(56) References Cited

U.S. PATENT DOCUMENTS

| | | | |
|---|---|---|---|
| 2005/0093868 A1* | 5/2005 | Hinckley | 345/502 |
| 2005/0101314 A1 | 5/2005 | Levi | |
| 2006/0256074 A1* | 11/2006 | Krum et al. | 345/156 |
| 2007/0026869 A1 | 2/2007 | Dunko | |
| 2009/0031258 A1* | 1/2009 | Arrasvuori et al. | 715/863 |
| 2009/0138507 A1 | 5/2009 | Burckart et al. | |
| 2010/0083373 A1* | 4/2010 | White et al. | 726/21 |

\* cited by examiner

DEVICE AND METHOD FOR CONDITIONALLY TRANSMITTING DATA

FIELD OF THE INVENTION

The invention relates to a device for conditionally transmitting data.

The invention further relates to a method of conditionally transmitting data.

The invention also relates to a computer program product enabling a programmable device to perform a method of conditionally transmitting data.

BACKGROUND OF THE INVENTION

U.S. Pat. No. 7,339,484 describes an event-driven discovery method and apparatus in which a common event, e.g. a handshake with another person, associated with a first device preparing to communicate with a second device is detected. The first device discovers the second device in response to detection of the common event. During discovery, the first and the second device exchange information and optionally may establish a communication session to exchange further information if desired. A drawback of the described method is that a user is unable to control with which other persons he wants to share certain data.

SUMMARY OF THE INVENTION

It is a first object of the invention to provide a device of the type described in the opening paragraph, which allows a user to control with which other persons he wants to share certain data.

It is a second object of the invention to provide a method of the type described in the opening paragraph, which allows a user to control with which other persons he wants to share certain data.

According to the invention, the first object is achieved in that the device comprises a receiver for receiving from a further device an identifier identifying a person in the vicinity of the device, warning means for providing a warning signal to a user of the device, a transmitter for transmitting data to said further device, and a controller for instructing said warning means to provide a warning signal in dependence on the identified person, for using a gesture detector for detecting a specific gesture by said user from among a plurality of gestures in response to the warning signal and for instructing said transmitter to transmit said data to said further device upon detecting said specific gesture, said data depending on said specific gesture. In this way, the gesture that the user makes determines what data is transmitted to the further device. The user is therewith able to transmit certain data to a first further device and its user, but not to a second further device and its user.

The gesture may be a salute, for example. Most suitable are gestures that a user would not normally make. The reason for this being to prevent undesired transmission of certain data. The warning signal may be provided (only) when the identified person is active in the same (social networking) community or game. The warning signal may indicate to which group of persons the identified person belongs, e.g. the color blue may mean "Colleague".

In an embodiment of the device of the invention, the device comprises a bracelet or a watch. Since the user would normally wear the bracelet or the watch almost continuously, making the gesture would not take much time and would be intuitive. When the device comprises a phone, key ring or wallet card, the user would first have to pick up the device.

The controller may be further operative to determine that a specific action in a game has been performed upon detection of said specific gesture. The user may be able to make different attacking gestures. If attacked himself, the user may be able to make a blocking gesture. Each attacking gesture may have a corresponding blocking gesture. A user may want to use a certain attack on a first person, but not on a second person. Vibrations may be used to indicate whether an attack was successful or blocked. During the battle, both devices may register the scores and may indicate a winner and a loser.

The controller may be operative to determine that a specific action in a game has been performed if said further device is within a certain distance of the device upon detection of said specific gesture. This makes the game more difficult, because the person carrying the further device may run away to escape an attack. The device may indicate the distance between the device and the further device.

The controller may be operative to instruct said transmitter to transmit data identifying said action or identifying a result of said action. The controller may transmit an identifier corresponding to a certain attacking or blocking action or may transmit an identifier corresponding to a result of an attack, e.g. whether the attack was successful or blocked. A successful attack may increase the attacker's points and/or decrease the defender's points.

The controller may be operative to instruct said transmitter to transmit a certain type of data, the certain type depending on said specific gesture. A user may want to share a certain type of data, depending on who the identified person is or to which group the identified person belongs. For example, a user may only want to share elaborate personal information with friends. The user of the further device may have to make the same specific gesture in order for the data exchange to really take place.

Said type of data may comprise one of elaborate personal information, limited personal information, music preferences and pictures. The user may not want to share all types of information with strangers and may want to share more information with good friends than with old classmates, for example.

According to the invention, the second object is achieved in that the method comprises the steps of receiving an identifier identifying a person in the vicinity of a device from a further device, providing a warning signal to a user of the device in dependence on the identified person, detecting a specific gesture by said user from among a plurality of gestures in response to the warning signal, and transmitting data to said further device upon detection of said specific gesture, said data depending on said specific gesture.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
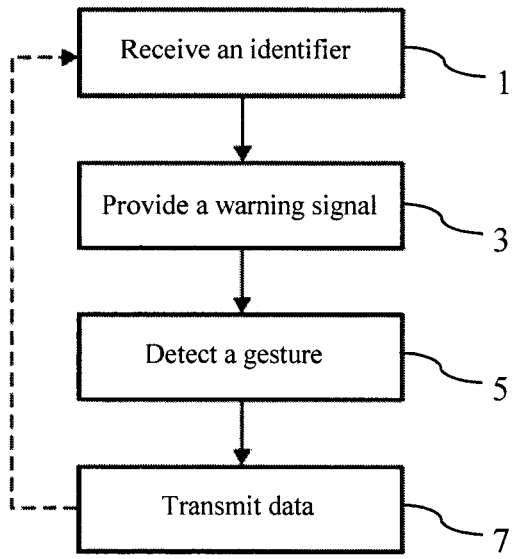
FIG. 1 is a flow diagram of the method of the invention.

The method comprises four steps, see FIG. 1. A step 1 comprises receiving an identifier identifying a person in the vicinity of a device from a further device. A step 3 comprises providing a warning signal to a user of the device in dependence on the identified person. A step 5 comprises detecting a specific gesture by said user from among a plurality of gestures in response to the warning signal. A step 7 comprises transmitting data to said further device upon detection of said specific gesture, said data depending on said specific gesture. After step 7, step 1 may be repeated.

Figure 2:
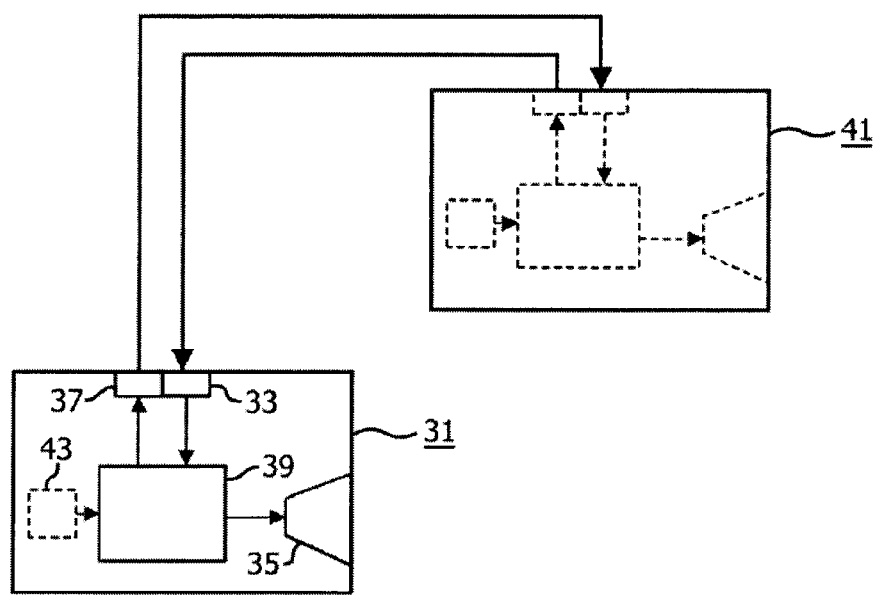
FIG. 2 is a block diagram of the device of the invention.

FIG. 2 shows the device 31 of the invention. The device 31 comprises a receiver 33 for receiving from a further device 41 an identifier identifying a person in the vicinity of the device, warning means 35 for providing a warning signal to a user of the device, and a transmitter 37 for transmitting data to said further device 41. The device further comprises a controller 39 for instructing said warning means 35 to provide a warning signal in dependence on the identified person, for using a gesture detector 43 for detecting a specific gesture by said user from among a plurality of gestures in response to the warning signal and for instructing said transmitter 37 to transmit said data to said further device 41 upon detection of said specific gesture, said data depending on said specific gesture.

The device 31 may be a bracelet, watch, phone, key ring or wallet card, for example. The further device 41 may be the same type of device as device 31. The receiver 33 and the transmitter 37 may be combined into a transceiver or may be separate components. The receiver 33 and the transmitter 37 may be capable of respectively receiving and transmitting Bluetooth, WiFi and/or other wireless signals. In addition to being used to respectively receive signals from and transmit signals to the further device 41, the receiver 33 and the transmitter 37 may further be used to respectively receive from and transmit to a PC used by the user of device 31 to synchronize the contents of the device 31 with the contents of the PC. Alternatively, this synchronization may be achieved by using wired transmission, e.g. with the help of a USB cable. The warning means 35 may comprise a speaker, a light (e.g. LED), a display and/or a vibration component, for example. The warning means may use different signals for different categories of identified persons. The gesture detector preferably comprises an accelerometer, but other ways of detecting gestures can also be used, e.g. a camera attached to the user's jacket.

First Embodiment

LINK

Connects & Shares

LINK is a pocket size mobile device that ties the online and offline worlds and not only gives a user real-life interaction with the people around him, but also allows him to share his desired profiles, interests or files with them.

In this embodiment, the device works as follows:

The user can go to a designated site to personalize his LINK device, create his own profile and control the information he wants to share with the different types of friends (e.g. good friends, just friends, indirect friends, strangers etc). He can also set the proximity at which he and the others will be alerted when "the LINK" is detected. The LINK criteria could be anything the user sets in his own profile, such as someone sharing the same interests or opinions, or he is looking for something the other can offer, old classmates or just a friend or indirect friend who is within his proximity.

To activate the device, the user can plug the USB connector of his LINK device into his PC. Upon disconnecting it from his PC, he can take the device to start searching people around him, which gives him the fun of exploring LINKs with others in his proximity anywhere and at any time. The user is alerted if someone with a LINK is detected within his proximity. The kind of vibration or the LED lights will tell what sort of LINK the user has with the other and the proximity of the other.

When contact is made, the user can have direct interaction by exchanging information and data with the other, sharing profiles, music, pictures, or any other data based on the types of programmed gestures they make simultaneously.

By plugging the LINK device back into his PC again, the user's new or updated profiles will be automatically updated in his site account. Furthermore the site will share information on all LINKS he and his connections have had offline-registered by the device, so he can follow the real-life social activeness of the people who are connected to him.

Second Embodiment

Gotcha Alert Game

Gotcha-Alert ties online and offline gaming and brings back the fun and excitement of real interaction and the physical challenges of outdoor gaming. Gotcha-Alert is an interactive game played outdoors where a user first needs to track the location of other players before "battling" them. Gotcha-Alert players can create their own communities by recruiting players. Social networking sites such as Facebook, Bebo and Twitter may allow players to recruit from within their friends' network to build their own community. These communities could also be powered by local sport clubs, radio stations, existing gaming communities or social events. A user can choose to battle within his community or the community can choose to battle other communities. The community can set the rules of their own game e.g. with respect to timing, number of players and rewarding.

Gotcha-Alert operates on a level up basis where a user needs to win his battles to move up to the next hierarchy level within his community. Once the user has signed up for a community, he needs to activate his device by plugging its USB connector into his PC. Now he is in the game. His device will alert him whenever his unknown victim is in his proximity. The device will indicate the distance of his victim. When he has located his victim and they are within the proximity of 10 feet of each other, the user can "battle" his victim.

To battle, the user will need to use his device—e.g. like a Samurai—and perform certain gestures with it to attack his victim. The device distinguishes between different attacking gestures. Each attack can be countered by the opponent using the correct blocking gesture. The two devices communicate their actions over Bluetooth in real time and use vibrations to indicate whether an attack was successful or blocked. During the battle, both devices register the scores and will indicate a winner and a loser.

When the user plugs his device back into his PC, all registered scores will be automatically updated to his account and a new unknown victim will be assigned to him. His site account will share the latest battles in his community, up to date scores, ranking (hierarchy level) and have a link to the online shop where he can customize a device for himself or for his gaming community.

Other possible features are:

The device may have an LCD display and/or a supported headset. The device can then give the user more precise indications, via display or voice, as to who he is LINKed with, e.g. name or picture, and what kind of LINKs he has with the others. The device can provide an extra gaming dimension via attack and block sounds and provide extra features, e.g. watching movies or listening to music.

The device may have a mood setting button that the user can switch off or on whenever he likes. He may be able to share his mood with others in his proximity, e.g. happy, sad, don't disturb, sexy or bored.

The user may be able to design his own device. He may be able to differentiate and personalize his bracelet, key ring, watch or wallet card exactly as he likes.

The user may be able to buy and login via his social networking site.

The device may be able to register the user's presence at events and allow the user to share that with his friends. The device can be used for visiting events such as dance events or concerts and will register the user's presence and the time of stay, start and finish.

Social networking & gaming may be integrated.

The device may be time-sensitive, i.e. the device may register when the user had the LINK. The user may be able to set the time via his device and may even be able to use it as a watch.

The device may have GPS functionality. The device may register where the user has been and where he had the LINK.

The device may be waterproof, so that it can be used anywhere, e.g. on the beach or while the user swims or showers with the device.

The device may glow instead of vibrate. It may even display special effects during night life.

The device may present advertising. Location-based stores can give special discount alerts based on profiles & proximity.

The device may be used to buy virtual gifts or to send someone in the user's proximity a vibrating kiss or hug. The user may be able to buy a virtual gift or more gaming power with obtained gaming points.

While the invention has been described in connection with preferred embodiments, it will be understood that modifications thereof within the principles outlined above will be evident to those skilled in the art, and thus the invention is not limited to the preferred embodiments but is intended to encompass such modifications. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. The invention can be implemented by means of hardware comprising several distinct elements, and by means of a suitably programmed computer. 'Software' is to be understood to mean any software product stored on a computer-readable medium, such as a floppy disk, downloadable via a network, such as the Internet, or marketable in any other manner.

The invention claimed is:

1. A device for conditionally transmitting data, the device comprising:
    a receiver for receiving from a further device an identifier identifying a person in the vicinity of the device;
    a warning unit for providing a warning signal to a user of the device;
    a transmitter for transmitting data to said further device; and
    a controller for instructing said warning unit to provide a warning signal in dependence on the identified person, for using a gesture detector for detecting a specific gesture by said user from among a plurality of gestures in response to the warning signal, and for instructing said transmitter to transmit said data to said further device upon detection of said specific gesture, said data depending on said specific gesture.

2. The device as claimed in claim 1, wherein the device comprises a bracelet or a watch.

3. The device as claimed in claim 1, wherein the controller is further operative to determine that a specific action in a game has been performed upon detection of said specific gesture.

4. The device as claimed in claim 3, wherein the controller is operative to determine that a specific action in a game has been performed if said further device is within a certain distance of the device upon detection of said specific gesture.

5. The device as claimed in claim 3, wherein the controller is operative to instruct said transmitter to transmit data identifying said action or identifying a result of said action.

6. The device as claimed in claim 1, wherein the controller is operative to instruct said transmitter to transmit a certain type of data, the certain type depending on said specific gesture.

7. The device as claimed in claim 6, wherein said type of data comprises one of elaborate personal information, limited personal information, music preferences and pictures.

8. A method of conditionally transmitting data, the method comprising:
    receiving an identifier identifying a person in the vicinity of a device from a further device;
    providing a warning signal to a user of the device in dependence on the identified person;
    detecting a specific gesture by said user from among a plurality of gestures in response to the warning signal; and
    transmitting data to said further device upon detection of said specific gesture, said data depending on said specific gesture.

9. A non-transitory computer program product having instructions stored therein which when executed cause a processing device to perform the method of claim 8.

* * * * *